United States Patent Office 3,138,086
Patented June 23, 1964

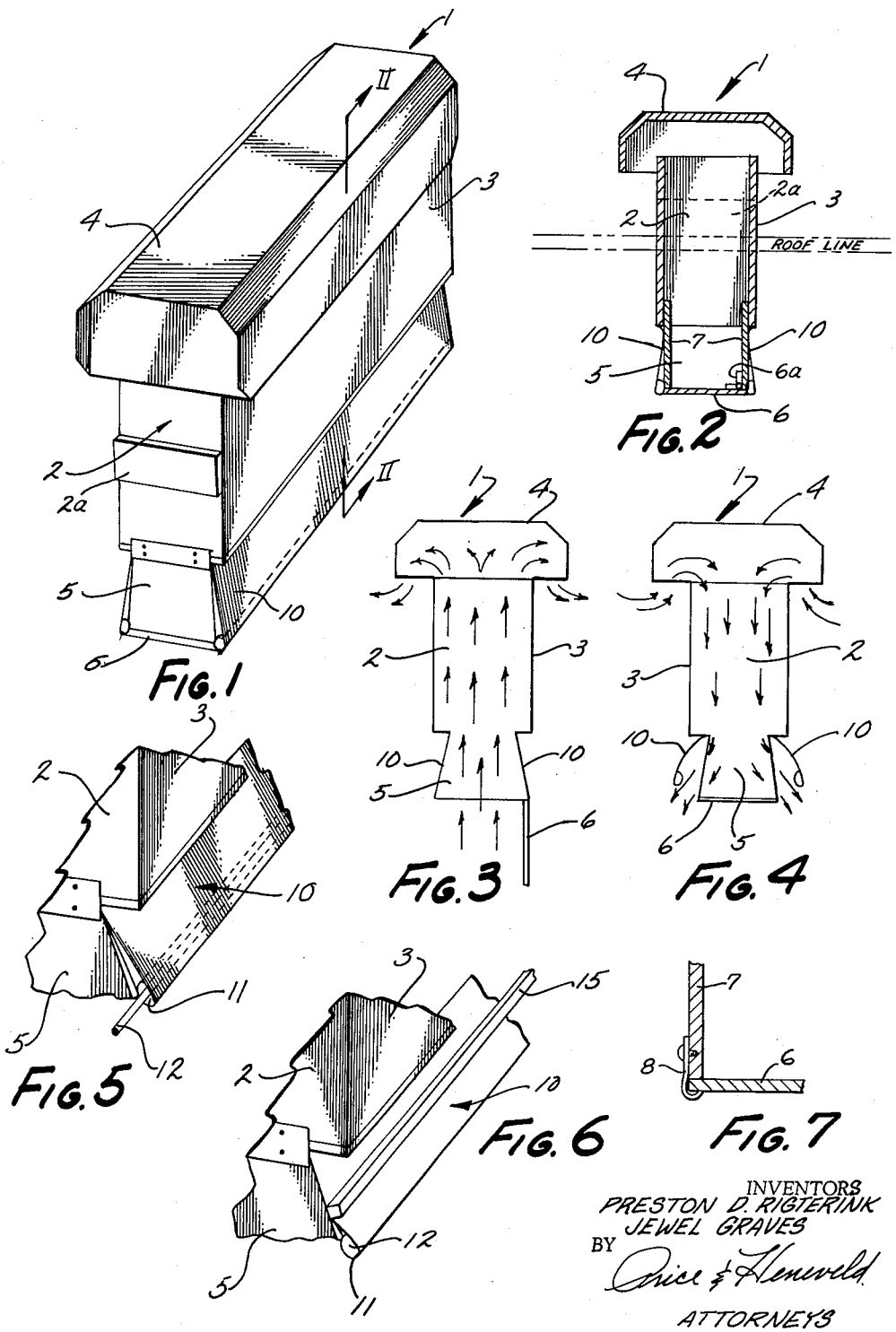

3,138,086
VENTILATOR
Preston D. Rigterink and Jewel Graves, Holland, Mich., assignors to Automatic Poultry Feeder Company, Zeeland, Mich., a corporation of Michigan
Filed Dec. 18, 1961, Ser. No. 160,201
4 Claims. (Cl. 98—37)

This invention relates to ventilators. More particularly, this invention relates to ventilators which are mounted in farm buildings to aid in the circulation of air about the animals in the building.

Agricultural scientists all agree that proper ventilation for animals within an enclosure is absolutely necessary and these scientists constantly stress the provision of better ventilation. Taking poultry as an example, ventilation is considered so important that there has been government condemnation of poultry raised in certain areas where ventilation has been neglected. Ventilation requirements vary with both the area and the season and it is extremely important that proper ventilation is provided in winter as well as in summer. Not only is proper ventilation necessary for good health, ventilation is also vital to good egg production. Further, unventilated buildings deteriorate faster and equipment rusts and wears out faster in unventilated structures.

Consequently, many ventilating structures have been provided, these structures being of many varying types. However, structures presently on the market have certain-inherent disadvantages. First of all, it is quite difficult to properly regulate the amount of air passing through these ventilators. If proper regulation is possible, the structures are so complex and expensive that their purpose is practically defeated. Since ventilation requirements are so varied as noted above, it is extremely important that exact control and regulation is provided. Secondly, it is difficult to use many ventilators presently in existence in the wintertime. Thirdly, many of the ventilators presently in existence do not operate effectively to circulate and direct air to and around the animals within the enclosure.

Therefore, an object of this invention is to provide a ventilator which can be quickly and simply regulated and adjusted for proper ventilating control.

Another object of this invention is the provision of such a ventilator which allows for both summer and winter ventilation.

Another object of this invention is the provision of such a ventilator which utilizes flexible flaps which are drawn outwardly when air is taken into the building.

A still further object of this invention is the provision of such a ventilator which directs incoming air to and around the animals within the enclosure.

An additional object of this invention is the provision of such a ventilator which is characterized by optimum simplicity in fabrication and operation.

These and other objects of this invention will become obvious to those skilled in the ventilator art upon reading the following specification in conjunction with the accompanying drawings, wherein:

FIG. 1 is a perspective view of a ventilator embodying the features of this invention;

FIG. 2 is a cross-sectional view taken along the plane II—II of FIG. 1;

FIG. 3 is a schematic view showing the manner in which air is exhausted from the ventilator;

FIG. 4 is a schematic view showing the manner in which air enters the building through the ventilator;

FIG. 5 is a perspective view of a lower corner of the ventilator shown in FIG. 1, the manner in which the flexible flap is controlled being shown in detail;

FIG. 6 is a perspective view of the corner of the ventilator shown in FIG. 5, an alternative structure for regulating the flap being shown; and FIG. 7 is a fragmentary cross section of the catch for holding the bottom of the ventilator in closed position.

Briefly, this invention relates to an improved ventilator for use in exhausting and drawing air from and into a building. This improved ventilator includes a housing and means in the housing allowing free passage of air therethrough. At least one of the walls of the housing has an opening formed therein and a flexible flap secured along its upper edge to the top of the opening. Thereby, air may be drawn through the means noted, through the housing, moving the flap outwardly therefrom and then passing into the building.

Referring more specifically to the drawings, the reference numeral 1 designates a ventilator made in accordance with this invention. The ventilator 1 includes a pair of end walls 2 and a pair of side walls 3, having a hood member 4 secured on the top of the housing formed by the end walls and side walls. An end panel 5 depends from each of the end walls 2, the end panel 5 and frame members 7 supporting a bottom 6 hingedly secured thereto (FIG. 2) by the hinge 6a. The catch 8 (FIG. 7) is provided to normally hold the bottom closed but is provided to flex and permit it to pivot downwardly in open position (FIG. 3). Proper reinforcing structure within this housing (not shown) is provided. This ventilator has the plates 2a secured to end walls 2 for supporting the ventilator above and below the roof line of a building as illustrated by FIG. 2.

A pair of flexible flaps 10 are secured to the ventilator 1. These flexible flaps 10 provide the covering for the housing below the side walls 3 and between the end panel 5. These flaps 10 may be fabricated of any material exhibiting sufficient flexibility to be movable by an air current. Many plastic materials presently available are well suited for use in fabricating these flaps, it having been found that "Lumite" Saran flaps are especially well suited. The flaps 10 are hingedly secured along their tops to the housing as shown in FIG. 2, free to move outwardly when air is drawn through the hood 4 and against the back of the flaps. The bottoms of the flaps 10 are sewn over to provide a pocket 11 as shown in FIG. 5. An elongated rod 12 is inserted into the formed pocket 11. Thus, as shown in FIG. 4, when air is drawn into the building through the ventilator 1 (for example by means of an exhaust fan mounted in the window of a building), air is drawn into the hood 4, through the ventilator itself, moving the flaps 10 outwardly as shown and enters the building being directed downwardly toward the animals therein. When air is not being drawn into the building, the flaps 10 lie against the end panels 5 and the bottom 6 of the ventilator 1. It will be noted that the weight of the rod 12 inserted in the pocket 11 determines the ease, and therefore the distance, with which the flaps may be drawn outwardly to admit air into the building. It will be noted therefore that rods of different weight can be provided to control the flow of air into the building. For example, the provision of an aluminum rod 12 in the pocket 11 will allow a great deal of air to enter the building since the flaps 10 are easily pushed outwardly. However, when heavier rods are inserted in the pockets 11, such as steel, the flaps will not move outwardly as great a distance, consequently, less air flows into the building. Therefore, by simply changing the rods 12, flow of air into the building is regulated.

An alternative method of regulating air flowing into the building is shown in FIG. 6. In this embodiment of the invention, an elongated strip of material 15, such as wood, is positioned over each flap 10 and secured to the sides of the end panels 5. Thus, depending on the spacing of the strip 15 from the top of the flaps 10, a regulated amount of air passes past the flaps 10. By simply moving the strip 15 up or down, the quantity of air is respectively increased or decreased.

In operation, the ventilator 1 is mounted in the roof of a building containing animals such as poultry, the number of such ventilators depending on the size of the building to be ventilated. The bottom 6 is normally pivoted upwardly (as shown in FIG. 2) and held in that position by catch 8 to enclose the bottom of the ventilator 1. The flaps 10, weighted by the rod 12 secured in the pockets 11 along their lower edges, complete the enclosure of the bottom of the ventilator. For normal summer use, the catch 8 is released and bottom 6 is pivoted downwardly as shown in FIG. 3. As designated by the arrows in this figure, air passes up through the bottom, through the ventilator housing and out of the hood 4 to the outside. During normal winter use, the bottom is closed and by means of an exhaust fan or the like mounted in a window of the building, air is drawn through the hood 4, through the housing of the ventilator and down into the building upon pushing the flexible flaps 10 outwardly as shown in FIG. 4. The amount of air thus drawn into the building is regulated by the weight of the rod inserted in the pockets along the lower edges of the flaps or by the means of the elongated strip being appropriately spaced and secured as shown in FIG. 6.

It will now be seen that this invention has provided a ventilator which provides for proper ventilation of a building both in summer or in winter, adapted for use in any part of the country. Through the use of the flexible flaps for taking air into the building, the air drawn in billows the flexible flaps outwardly and circulates the air down on and around the animals within the building. Further, the exact amount of air drawn in can be readily regulated as described. These results are accomplished through the provision of a structure extremely simple to fabricate and operate.

While only certain embodiments of this invention have been shown and described, it may be possible to practice the invention through the utilization of certain other embodiments without departing from the spirit and scope thereof. Such other embodiments are to be included as part of this invention unless the following claims specifically state otherwise.

We claim:
1. An improved ventilator for use in drawing air into a building, comprising: a housing constructed of downwardly extending wall enclosure means and a normally closed bottom; said housing having a first opening means in the top portion of said housing adapted for location above a roof of a building and a second opening in the bottom thereof adapted for location below a roof of a building; cover means over said housing; said opening means in said housing and said cover means allowing free passage of air therethrough; said wall enclosure means of said housing having said second opening means formed therein; and a flexible flap secured along its upper edge to said wall enclosure means at the top of said second opening means and extending downwardly thereover whereby when air is drawn through said housing into said first opening and out of said second opening said flap is adapted to move outwardly from said housing.

2. The device of claim 1 in which the normally closed bottom is mounted for movement to provide an opening in the bottom of said housing.

3. The device of claim 1 in which weights are mounted at the lower free edge of said flaps.

4. The device of claim 3 in which the weights are elongated rods slidably inserted into a pocket formed along the bottom of said flap.

References Cited in the file of this patent

UNITED STATES PATENTS

| | | |
|---|---|---|
| 162,261 | Wightman | Apr. 20, 1875 |
| 476,134 | Duesterwald | May 31, 1892 |
| 872,199 | Ross | Nov. 26, 1907 |
| 1,053,507 | Hiett | Feb. 18, 1913 |
| 1,397,739 | Moyer | Nov. 22, 1921 |
| 1,547,974 | Thaw | July 28, 1925 |
| 1,600,522 | Strehlke | Sept. 21, 1926 |
| 1,623,286 | Strahan | Apr. 5, 1927 |
| 2,218,926 | Tiechmann | Oct. 22, 1940 |
| 2,723,616 | Hubbard | Nov. 15, 1955 |